July 1, 1924.  1,499,528

R. B. HARTMAN

BRAKE BAND AND LINING

Original Filed Feb. 2, 1920    2 Sheets-Sheet 1

Inventor
Richard B. Hartman
By Stuart L. Barnes
Attorney

July 1, 1924.
R. B. HARTMAN
BRAKE BAND AND LINING
Original Filed Feb. 2, 1920   2 Sheets-Sheet 2
1,499,528
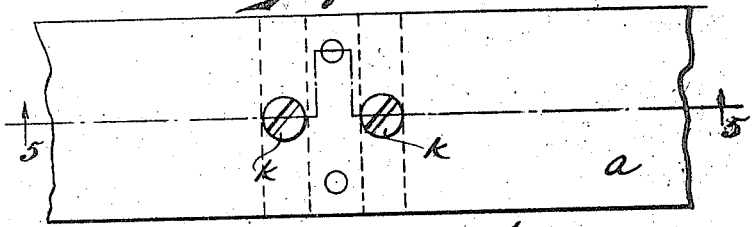
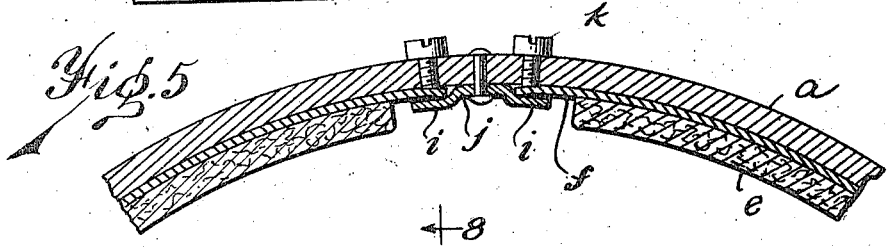
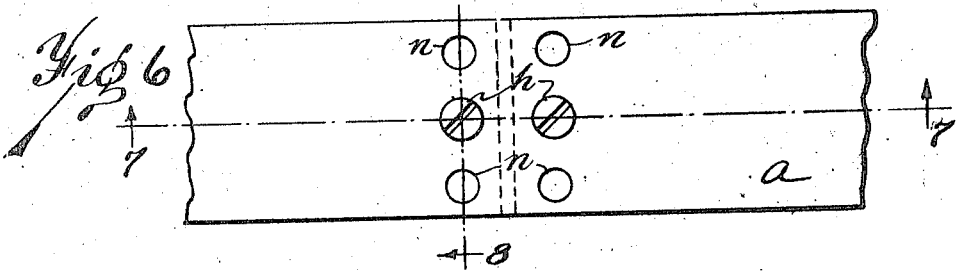
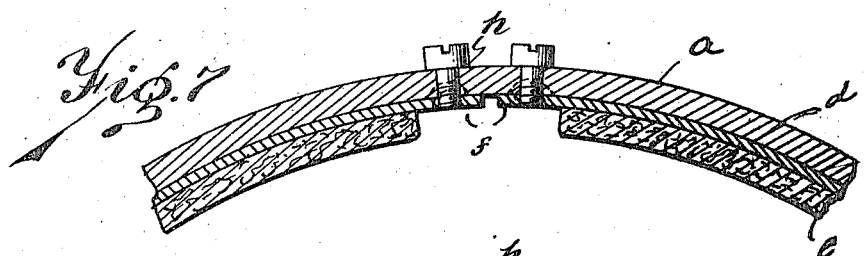
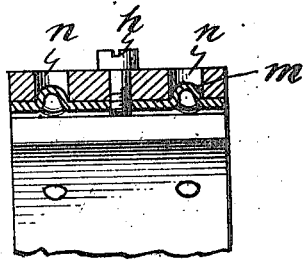
Inventor
Richard B. Hartman
By Stuart C. Barnes Patented July 1, 1924.

1,499,528

UNITED STATES PATENT OFFICE.

RICHARD B. HARTMAN, OF CORDELL, OKLAHOMA, ASSIGNOR TO HARTMAN BRAKE CORPORATION.

BRAKE BAND AND LINING.

Application filed February 2, 1920, Serial No. 355,845. Renewed December 15, 1923.

*To all whom it may concern:*

Be it known that I, RICHARD B. HARTMAN, a citizen of the United States, residing at Cordell, in the county of Washita and State of Oklahoma, have invented certain new and useful Improvements in Brake Bands and Linings, of which the following is a specification.

This invention relates to brake linings and has for its object a brake lining made up of a plurality of sections. The sections may be removably secured to the brake band simply by the turning of screws. In a co-pending application (355,285) I have described more generically removable brake-lining segments and means for clamping or retaining them removably on the brake band. This present application is intended to cover a species of retaining means for holding the brake-lining segments removably on the brake band.

This application also illustrates and describes a brake band made up of two hinged parts which permits the band to be re-lined by turning back one of the brake band halves if this is desired. However, this is not an essential part of the invention and it is possible to insert the brake-lining segments between the drum and the band without in any way loosening up the band.

In the drawings,—

Fig. 4 is a fragmentary plan view of a modified form.

Fig. 5 is a fragmentary longitudinal section of the same.

Fig. 6 is a fragmentary plan view of still a further modified form.

Fig. 7 is a fragmentary longitudinal section of the same.

Fig. 8 is a cross section of the same.

*a* designates the brake band; *b* the brake drum. The brake band is made up of two sections that are hinged together at *c* to form an upper half and a lower half. This permits the upper half to be released and turned back to be re-lined if this is desirable, but it is possible to easily re-line the brake without turning back this half. The brake-lining is made in the form of segments. Each segment has a metal backing *d*. A piece of brake-lining *e* is fastened to the segment backing *d* in any conventional way but extends short of the ends of the segments so as to leave exposed portions *f*. These exposed portions *f* are provided with tapped holes *g* adapted to take the cap screw *h*.

Obviously by releasing the cap screws at each end of a single segment and turning them up in the band until the screw is out of the tapped hole, a segment is released and may be removed sidewise between the band and the drum. The new segment may be easily inserted in the place left vacant and the screws turned down again in the tapped holes to clamp the new segment in place.

In Figs. 4 and 5 instead of tapping the exposed portions *f* at the end of the brake segments, I employ a clip *j* that is riveted to the brake band at its mid portion and is provided with a pair of offset wings *i* adapted to form a pocket to receive the ends of the brake segments. These may be slipped into the pockets and then the screws *k* turned down on the top of the brake segment to jam them against the offset wings of the clip.

Figure 1:
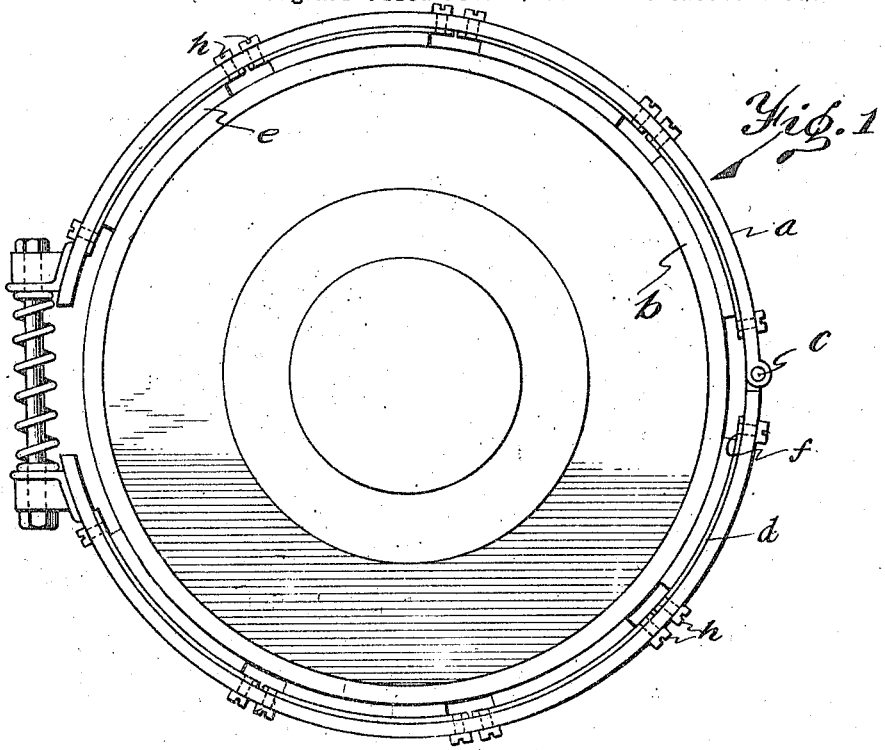
Fig. 1 is an inside elevation of a brake drum and brake band, the latter made in two halves that are hinged together.
Figure 2:
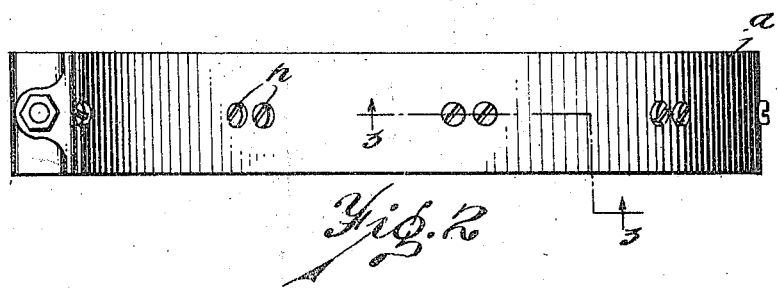
Fig. 2 is a top plan view showing the top of the brake band.
Figure 3:
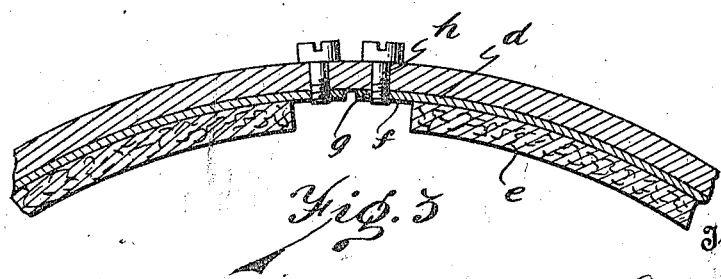
Fig. 3 is a fragmentary longitudinal section of the brake band with the lining segments in place.

In Figs. 7 and 8 I have shown a modified form which, so far as the screws are concerned, works in the same way as the form shown in Figs. 2 and 3, but in order to properly locate the brake segment so as to cause same to properly register with the brake band, semi-spherical bosses *m* are stamped in the metal backing of the brake segment and these are adapted to slip into perforations *n* through the brake band. This insures the brake band segment properly lining up with the brake band and at the same time the tapped hole in the brake segment backing registering with the hole through which the screw is passed in the band.

What I claim is:

1. In a brake, the combination of a drum having a cylindrical braking surface, a band provided with openings therethrough and concentric with the braking surface of the drum, a plurality of brake-lining segments comprising each a backing in the form of a segment of a cylinder and a piece of lining material secured thereto, and screws passing through the openings in the band and engaging the backing of the segments for removably holding the segments in place.

2. In a brake, the combination of a drum having a cylindrical braking surface, a brake band provided with openings therethrough and concentric with said braking surface, a plurality of cylindrical segments comprising each a backing and a piece of lining material secured thereto but extending short of the ends of the backing, and screws passing through the openings in the band and engaging with the exposed end portions of the backings of the segments to hold the segments removably in the band.

3. In a brake, the combination of a band provided with openings therethrough, a plurality of brake-lining segments comprising each a backing lined with brake-lining material running short of the ends of the backing leaving exposed end portions that are provided with tapped holes, and screws passing through the openings in the band and engaging the threads of the tapped holes for removably holding the brake-lining segments to the band.

4. In a brake, the combination of a band provided with openings therethrough, a plurality of brake-lining segments comprising each a backing and having a piece of lining material secured to the face thereof, said backing provided with bosses thereon adapted to engage some of the openings in the band to cause the segment to properly register with the band, and screws passing through other openings in the band and engaging the segment backings for removably securing the brake-lining segments to the band.

5. In a brake, the combination of a band provided with openings therein, brake-lining segments comprising each a backing and a piece of brake-lining material secured thereto, each backing being provided with one or more bosses rising from the rear thereof and adapted to be engaged in one or more of the openings in the brake band to properly line up the segment with the band, and means for removably securing the brake-lining segment to the band.

In testimony whereof I affix my signature.

RICHARD B. HARTMAN.